(12) United States Patent
Nagai et al.

(10) Patent No.: US 7,956,586 B2
(45) Date of Patent: Jun. 7, 2011

(54) STEP-UP/STEP-DOWN TYPE DC-DC CONVERTER, AND CONTROL CIRCUIT AND CONTROL METHOD OF THE SAME

(75) Inventors: Ryuta Nagai, Kasugai (JP); Takashi Matsumoto, Kasugai (JP); Koichi Inatomi, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 313 days.

(21) Appl. No.: 11/812,142

(22) Filed: Jun. 15, 2007

(65) Prior Publication Data

US 2007/0290667 A1    Dec. 20, 2007

(30) Foreign Application Priority Data

Jun. 16, 2006    (JP) ................................. 2006-167677

(51) Int. Cl.
G05F 1/59    (2006.01)
G05F 1/595    (2006.01)
(52) U.S. Cl. ......... 323/225; 323/259; 323/271; 323/284
(58) Field of Classification Search .................. 323/225, 323/259, 268, 271, 344, 282, 284, 285
See application file for complete search history.

(56) References Cited

U.S. PATENT DOCUMENTS

| | | | |
|---|---|---|---|
| 4,395,675 A | | 7/1983 | Toumani |
| 5,402,060 A | | 3/1995 | Erisman |
| 6,087,816 A | | 7/2000 | Volk |
| 6,166,527 A | * | 12/2000 | Dwelley et al. ............... 323/222 |
| 6,275,016 B1 | | 8/2001 | Ivanov |
| 6,788,033 B2 | * | 9/2004 | Vinciarelli .................... 323/225 |
| 7,157,888 B2 | * | 1/2007 | Chen et al. .................... 323/224 |
| 7,443,147 B2 | * | 10/2008 | Kasai et al. ................... 323/259 |
| 2004/0212356 A1 | * | 10/2004 | Dowlatabadi ................. 323/282 |
| 2005/0206354 A1 | * | 9/2005 | Ikezawa ........................ 323/248 |

FOREIGN PATENT DOCUMENTS

| | | | |
|---|---|---|---|
| JP | 55-68877 A | | 5/1980 |
| JP | 56-141773 A | | 11/1981 |
| JP | 2005-192312 A | | 7/2005 |
| JP | 2006-294392 | * | 10/2006 |

OTHER PUBLICATIONS

"Chinese Office Action," mailed Oct. 30, 2009 in corresponding CN Patent Appl. No. 200710109427.5, Full English translation.

* cited by examiner

*Primary Examiner* — Gary L Laxton
*Assistant Examiner* — Nusrat J Quddus
(74) *Attorney, Agent, or Firm* — Fujitsu Patent Center

(57) ABSTRACT

To provide a control circuit and control method of a step-up/step-down type DC-DC converter capable of realizing high efficiency. In a state (1), a terminal Tx of a choke coil L1 is connected to an input terminal Tin, and a terminal Ty is connected to a reference potential. In a state (2), the terminal Tx is connected to the reference potential, and the terminal Ty is connected to an output terminal Tout. In the state (3), the terminal Tx is connected to the input terminal Tin, and the terminal Ty is connected to the output terminal Tout. A first period operation TO1 is constituted by the states (1) and (2), and a second period operation TO2 is constituted by the states (1) and (3). A second period T2, in which the second period operation TO2 is performed, is a value n times as long as a first period T1, in which the first period operation TO1 is performed. In the second period operation TO2, the state (1) is switched to the state (3) so that an increasing slope of an inductor current IL is reduced.

15 Claims, 11 Drawing Sheets

CIRCUIT DIAGRAM OF STEP-UP/STEP-DOWN TYPE DC-DC CONVERTER 1

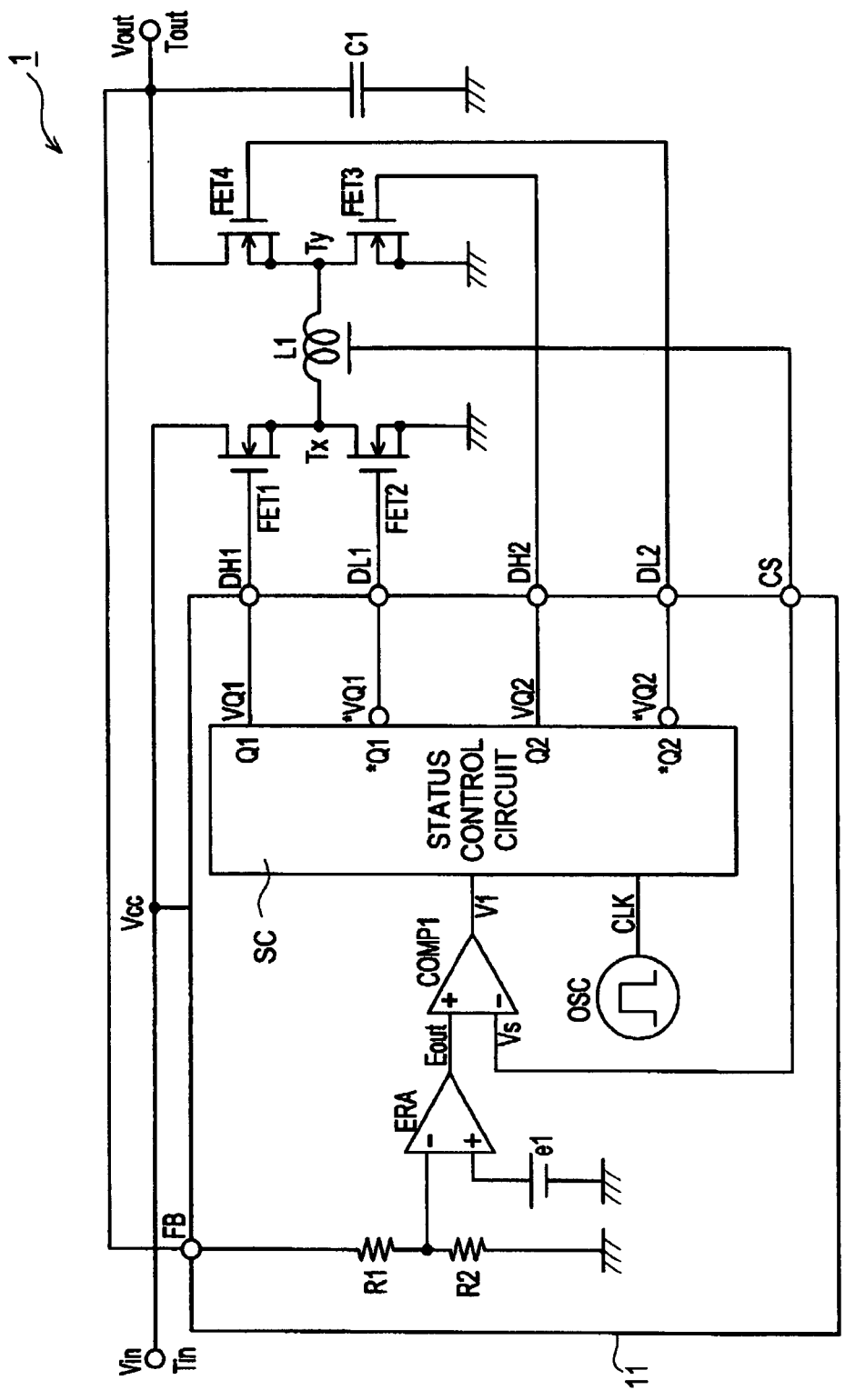
FIG. 1   CIRCUIT DIAGRAM OF STEP-UP/STEP-DOWN TYPE DC-DC CONVERTER 1

FIG. 2  CIRCUIT DIAGRAM SHOWING STATE (1)
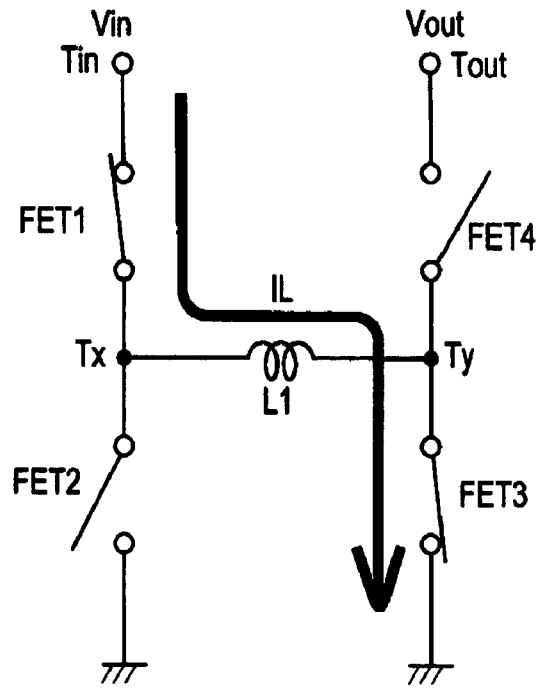
FIG. 3  CIRCUIT DIAGRAM SHOWING STATE (2)
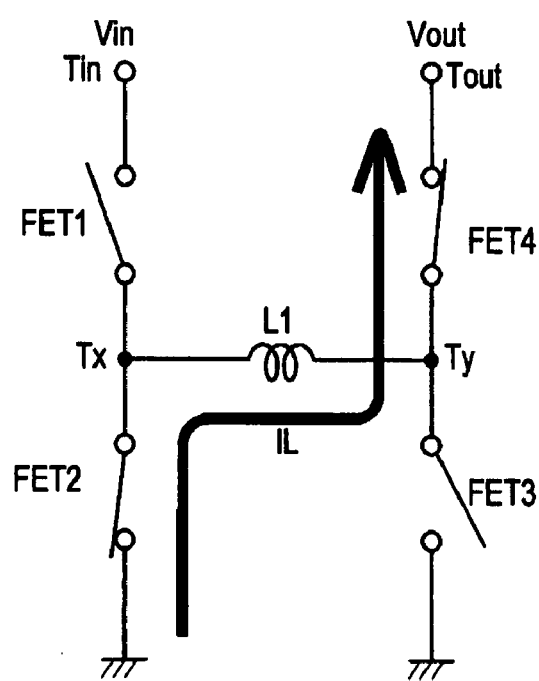

FIG. 4 CIRCUIT DIAGRAM SHOWING STATE (3)
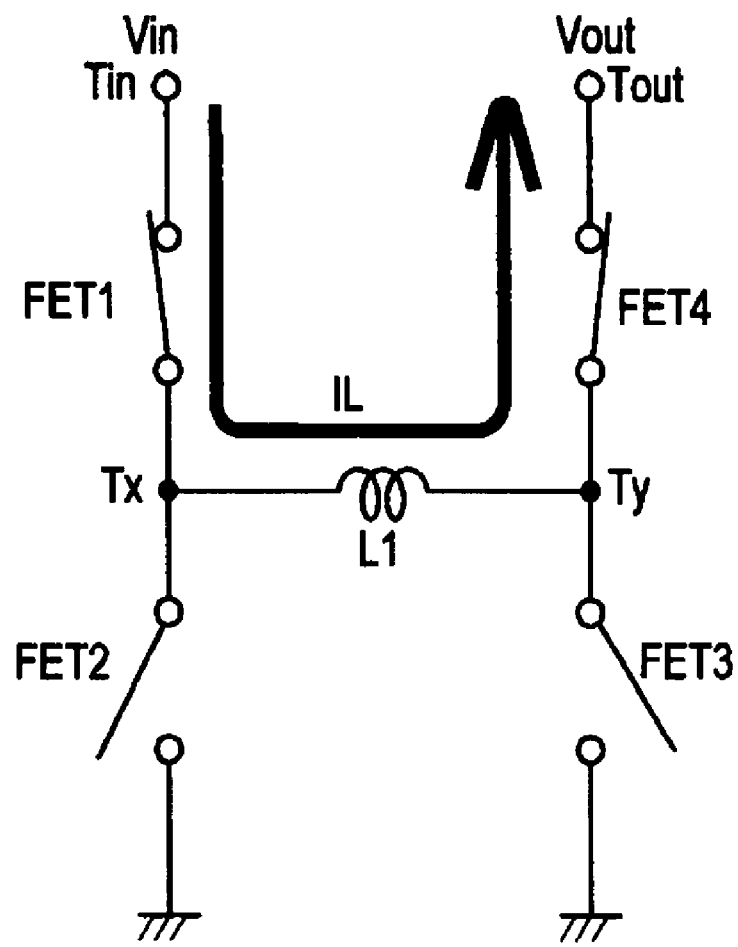

FIG. 7 WAVEFORM DIAGRAM SHOWING CONVENTIONAL CIRCUIT OPERATION

FIG. 8 STATE TRANSITION DIAGRAM OF SECOND EMBODIMENT

FIG. 9 WAVEFORM DIAGRAM OF DC-DC CONVERTER 1 OF SECOND EMBODIMENT

FIG. 10 CIRCUIT DIAGRAM OF DC-DC CONVERTER 1b

FIG. 11 WAVEFORM DIAGRAM OF DC-DC CONVERTER 1b OF THIRD EMBODIMENT

CIRCUIT DIAGRAM OF CONVENTIONAL
DC-DC CONVERTER 100

US 7,956,586 B2

STEP-UP/STEP-DOWN TYPE DC-DC CONVERTER, AND CONTROL CIRCUIT AND CONTROL METHOD OF THE SAME

CROSS-REFERENCE TO RELATED APPLICATIONS

This application is based upon and claims the benefit of priority from each of the prior Japanese Patent Applications No. 2006-167677 filed on Jun. 16, 2006 and Japanese Patent Application No. 2007-151323 filed on Jun. 7, 2007, the entire contents of which are incorporated herein by reference.

BACKGROUND OF THE INVENTION

1. Field of the Invention

The field relates to a step-up/step-down type DC-DC converter, and a control circuit and control method of the same, more particularly, it relates to a step-up/step-down type DC-DC converter capable of reducing an average switching frequency of switching elements and of realizing high efficiency.

2. Description of Related Art

In a step-up/step-down type DC-DC converter, a state (1) for accumulating energy into an inductor from an input side and state (2) for discharging the energy from the inductor to an output side are alternately repeated at a predetermined frequency by on/off operations of switching elements, the inductor being connected to three terminals, a voltage input terminal, voltage output terminal and reference potential.

In a step-up/step-down type DC-DC converter disclosed in U.S. Pat. No. 6,087,816, there is further provided a state (3) for connecting a voltage input terminal to a voltage output terminal via an inductor, and supplying energy to an output. In one clock cycle, switching between the state (1) and state (3) or between the state (2) and state (3) is performed.

Furthermore, a conventional step-up type DC-DC converter 100 shown in FIG. 12 comprises transistors FET101 through FET103. When operation the DC-DC converter 100 is stopped, the transistor FET103 is set OFF so as to block dark current which flows from input voltage Vin to load RL.

Moreover, U.S. Pat. No. 6,275,016, Japanese Published Unexamined Patent Application No. 2005-192312, Japanese Published Unexamined Patent Application No. S55-68877, U.S. Pat. No. 5,402,060, U.S. Pat. No. 4,395,675, Japanese Published Unexamined Patent Application No. S56-141773 and Japanese Published Unexamined Patent Application No. 2000-134943 are disclosed as related art with the above.

Recent demands for miniaturizing and lightening electrical devices have advanced miniaturization of inductors. Which brings necessity to suppressing a peak-to-peak current value of inductor current, so that a switching frequency rises and a switching loss tends to increase. Therefore, it is necessary to reduce the switching frequency while suppressing the peak-to-peak current value of the inductor current to reduce the switching loss. However, reducing the switching frequency is not disclosed in U.S. Pat. No. 6,087,816, and the switching loss cannot be reduced, which pose a problem.

Furthermore, when the conventional step-up type DC-DC converter 100 shown in FIG. 12 starts up from operation-stopped state and the transistor FET103 is set ON, charge current to an output capacitor C101 turns into rush current Ir. Consequently, instantaneous lowering of input voltage occurs, which is problematic because it is likely to cause glitch such as invoking of a protection circuit, and the like. Furthermore, since an output voltage Vout sharply steps up to an input voltage Vin from 0 (V) due to rush current, that makes it impossible to carry out a soft-start control which is a control manner to step the up output voltage Vout from 0 (V) to a predetermined set voltage gradually. This is problematic aspect of the conventional art. Furthermore, rush current Ir can possibly destroy each constituent element of the circuit, which is also problematic.

SUMMARY OF THE INVENTION

In order to resolve at least one of the problems of the background art, and it is a first proposition to provide a step-up/step-down type DC-DC converter capable of reducing the number of switching times per a unit time of switching elements, an average switching frequency, while suppressing the peak-to-peak current value of the inductor current, and capable of realizing high efficiency. It is a second proposition to provide a step-up/step-down type DC-DC converter capable of stepping up a voltage satisfying both soft-start control and prevention of dark current.

BRIEF DESCRIPTION OF THE DRAWINGS

FIG. 1 is a circuit diagram of a step-up/step-down type DC-DC converter 1;

FIG. 2 is a circuit diagram showing a state (1);

FIG. 3 is a circuit diagram showing a state (2);

FIG. 4 is a circuit diagram showing a state (3);

DETAILED DESCRIPTION OF THE PREFERRED EMBODIMENTS

Figure 5:
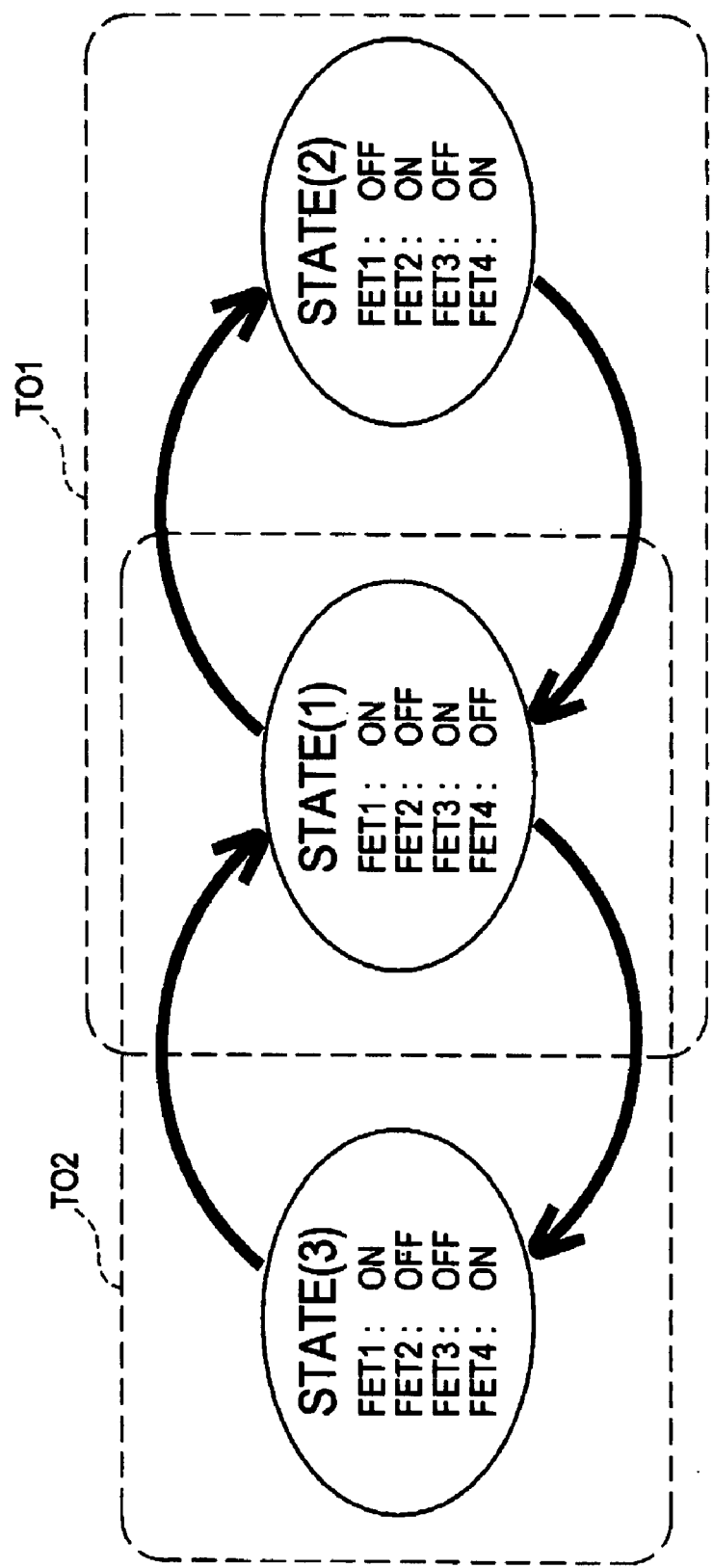
FIG. 5 is a state transition diagram of a first embodiment.

A first state is a state where the first and second switching elements are ON. In this case, one terminal of the inductance element is connected to the voltage input terminal, and the other terminal thereof is connected to the reference potential. In the first state, energy is accumulated into the inductance element from the voltage input terminal side, and the inductor current increases at a constant steep slope with passage of time. An increasing slope is calculated by (input voltage)/(inductance value).

A second state is a state where the first and second switching elements are OFF. In this case, one terminal of the inductance element is connected to the reference potential, and the other terminal thereof is connected to the voltage output terminal. In the second state, the energy is discharged from the inductance element to the voltage output terminal side, and the inductor current decreases at a constant steep slope with passage of time. A decreasing slope is calculated by −(output voltage)/(inductance value).

A third state is a state where the first switching element is ON and the second switching element is OFF. In this case, one terminal of the inductance element is connected to the voltage input terminal, and the other terminal thereof is connected to the voltage output terminal. In the third state, when the input voltage is higher than the output voltage, the energy from the voltage input terminal side is accumulated into the inductance element, and simultaneously supplied to the voltage output terminal side, and the inductor current increases at a constant slope with passage of time. On the other hand, when the input voltage is lower than the output voltage, the energy is discharged from the inductance element to the voltage output terminal side, and the inductor current decreases at a constant slope with passage of time. At this time, increasing and decreasing slopes of the inductor current in the third state are smaller than the increasing slope in the first state and the decreasing slope in the second state respectively. Additionally, when the input voltage approaches the output voltage, the increasing/decreasing slope of the inductor current in the third state becomes approximately. zero. Then, conduction control for the first and second switching elements is performed to realize the first, second and third states.

A first period operation includes the second state and is an operation performed in a predetermined first period. In the second state of the first period operation, the inductor current decreases at the constant steep slope. A second period operation includes the first and third states and is an operation performed in a second period longer than the first period. In the first state of the second period operation, the inductor current increases at the constant steep slope. In the third state of the second period operation, the inductor current increases at a slope gentler than that in the first state, or decreases at a slope gentler than that in the second state. Then, the first and second period operations are repeated.

In the second period operation, the first state is switched to the third state so that the increasing slope of the conductor current is reduced. Therefore, the peak-to-peak current value of the inductor can be prevented from increasing, and the second period of the second period operation can be lengthened in comparison to the first period of the first period operation. Thus, an average switching frequency of the first and second switching elements can be reduced, and switch driving loss generated in switching on/off and conduction loss of the switch in a transitional state in switching ON (OFF) to OFF (ON) can be reduced. Therefore, efficiency of the DC-DC converter can be enhanced.

A soft-start control circuit outputs a soft-start signal of which value goes up or goes down as time passes. In case the control intends to step up an output voltage from zero to a set voltage gradually, a value of a soft-start signal is made to go up. Contrarily, in case the control intends to step down the output voltage from the set voltage to zero gradually, a value of a soft-start signal is made to go down. An error amplifier amplifies an error, i.e., difference between: either a reference voltage to define a set voltage for an output voltage or a value of a soft-start signal, whichever is lower; and the output voltage. A switching control circuit switches control among first through fourth switching elements depending on high-low relation of an output voltage and an input voltage. Furthermore, the switching control circuit also controls switching duty of the first through fourth switching elements depending on an output from the error amplifier.

There will be described operation-stop of a DC-DC converter. When operation of a DC-DC converter is stopped, the first through fourth switching elements are kept OFF. It is to be noted that the first switching element is provided on a current path, from a voltage input terminal to a voltage output terminal, and polarity of a body diode included in the first switching element is made in an inverse direction, i.e., from the voltage input terminal to the voltage output terminal. Accordingly, the current path from the voltage input terminal to the voltage output terminal is blocked by the first switching element. This mechanism makes it possible to avoid occurrence of dark current which flows from the voltage input terminal to the voltage output terminal when operation of the DC-DC converter is stopped. Furthermore, by avoiding dark current, a value of the output voltage obtained when operation of the DC-DC converter is stopped can be kept 0 (V).

Next, there will be described a period where the output voltage is lower than the input voltage while the DC-DC converter is in operation. During the specified period, a first state where the first and third switching elements are set ON and a second state where the second and fourth switching elements are set ON are switched alternately by the switching control circuit. Switching duty of the first through fourth switching elements is determined depending on an output from the error amplifier.

In the first state, a first terminal and a second terminal of an inductance element are connected to the voltage input terminal and a reference potential, respectively. Therefore, energy is accumulated into the inductance element from the voltage input terminal side. In the second state, the first terminal and the second terminal of the inductance element are connected to the reference potential and the voltage output terminal, respectively. Therefore, the energy is discharged to the voltage output terminal side from the inductance element. With the first state and the second state being repeated alternately, step-up/step-down operation is carried out. Since the step-up/step-down operation avoids direct electric conduction between the voltage input terminal and the voltage output terminal, this makes it possible to prevent rush current from flowing to the voltage output terminal side from the voltage input terminal. Since the output voltage can be prevented from stepping up to the input voltage sharply, this realizes the soft-start operation to make the output voltage step-up or step-down gradually along rise or drop of a soft-start signal.

There will be further described a period where the output voltage is higher than the input voltage while the DC-DC converter is in operation. During such that period, the switching control circuit keeps the first switching element and the second switching element ON and OFF, respectively. Furthermore, the switching control circuit carries out set-ON switching between the third switching element and the fourth switching element alternately. Accordingly, a step-up converter can be constituted by the third switching element, the fourth switching element and the inductance element. Furthermore, switching duty of the third and fourth switching elements are determined depending on an output from the error amplifier.

When the third switching element and the fourth switching element are set ON and OFF, respectively, the second terminal of the inductance element is connected to the reference potential, whereby the energy is accumulated into the inductance element from the voltage input terminal side. Furthermore, when the third switching element and the fourth switching element are set OFF and ON, respectively, the second terminal of the inductance element is connected the voltage output terminal, whereby the energy is discharged to the voltage output terminal side from the inductance element. With ON-setting being switched between the third switching element and the fourth switching element alternately, step-up operation is carried out. With step-up/step-down operation being switched to step-up operation, the number of switching-operation-subject transistors can be reduced from four, namely, the first through fourth switching elements, to two, namely, the third and fourth switching elements. Therefore, this makes it possible to reduce switching loss.

At a step where the first through fourth switching elements are set OFF, the DC-DC converter is made operation-stopped state. At this moment, the current path from the voltage input terminal to the voltage output terminal is blocked by the first switching element. This situation can avoid dark current which flows from the voltage input terminal to the voltage output terminal when operation of the DC-DC converter is stopped.

In response to a start-up command to activate the operation-stopped-state DC-DC converter, the above-mentioned step shifts to a step where a first state and a second state are carried out alternately. At the first state, the energy is accumulated into the inductance element from the voltage input terminal side. At the second state, the energy is discharged to the voltage output terminal side from the inductance element. With the first state and the second state being repeated alternately, step-up/step-down operation is carried out. Since the step-up/step-down operation avoids direct electric conduction between the voltage input terminal and the voltage output terminal, this makes it possible to prevent rush current from flowing to the voltage output terminal side from the voltage input terminal. Thereby, the soft-start operation can be realized.

The above-mentioned step shifts to a step where the first switching element and the second switching element are kept ON and OFF, respectively, when the output voltage becomes higher than the input voltage, and operation of set-ON switching is carried out between the third switching element and the fourth switching element alternately in response to an output from the error amplifier. At this step, a step-up converter is constituted by the third switching element, the fourth switching element and the inductance element, whereby step-up operation is carried out. With the step-up/step-down operation being switched to the step-up operation, the number of switching-operation-subject transistors can be reduced from four, namely, the first through fourth switching elements, to two, namely, the third and fourth switching elements. Therefore, this makes it possible to reduce switching loss.

As described, the above-described step-up/step-down type DC-DC converter, and a control circuit and a control method of the step-up/step-down type DC-DC converter can avoid dark current when operation of the DC-DC converter is stopped. Furthermore, at a term where the output voltage is lower than the input voltage while the DC-DC converter is in operation, step-up/step-down operation is carried out so that prevention of rush current occurrence and the soft-start operation can be realized. Furthermore, at a period where the output voltage is higher than the input voltage while the DC-DC converter is in operation, step-up operation is carried out so that switching loss can be reduced. Thus, there can be provided a step-up/step-down type DC-DC converter capable of stepping up a voltage while satisfying both soft-start control and prevention of dark current.

The above and further objects and novel features will more fully appear from the following detailed description when the same is read in connection with the accompanying drawings. It is to be expressly understood, however, that the drawings are for the purpose of illustration only and are not intended as a definition of the limits of the invention. FIG. 1 is a circuit diagram of a step-up/step-down type DC-DC converter 1. This DC-DC converter has a constitution of a so-called H-bridge type switching regulator, and includes: a choke coil L1; transistors FET1, FET2, FET3 and FET4; an output capacitor C1; and control circuit 11. An input terminal Tin is connected to a drain terminal of the transistor FET1, and an input voltage Vin is inputted into the FET1. A source terminal of the transistor FET1 is connected to a terminal Tx of the choke coil L1 and a drain terminal of the transistor FET2. A source terminal of the transistor FET2 is connected to a reference potential. Gate terminals of the transistors FET1 and FET2 are connected to output terminals DH1 and DL1 of the control circuit 11 respectively.

A drain terminal of the transistor FET4 is connected to an output terminal Tout, and the input voltage Vin is increased or decreased to be outputted as an output voltage Vout. The output capacitor C1 for accumulating power supplied via the choke coil L1 is connected between the output terminal Tout and the reference potential. Further, the output terminal Tout is connected to an input terminal FB of the control circuit 11. A source terminal of the transistor FET4 is connected to a terminal Ty of the choke coil L1 and a drain terminal of the transistor FET3. A source terminal of the transistor FET3 is connected to the reference potential. Gate terminals of the transistors FET3 and FET4 are connected to output terminals DH2 and DL2 respectively. Additionally, the input voltage Vin is supplied to the control circuit 11 as a source voltage Vcc.

A constitution of the control circuit 11 will be described. A current sense signal Vs detecting an inductor current IL flowing through the choke coil L1 is inputted into an input terminal CS. The input terminal FB is connected to one terminal of a resistance element R1 connected to the reference potential via a resistance element R2. A connection point between the resistance elements R1 and R2 is connected to an inverting input terminal of an error amplifier ERA. Further, a reference voltage e1 is applied to a non-inverting input terminal of the error amplifier ERA. An output signal Eout is outputted from the error amplifier ERA. An output terminal of the error amplifier ERA is connected to a non-inverting input terminal of a voltage comparator COMP1, and the output signal Eout is inputted into the COMP1. Additionally, the input terminal CS is connected to an inverting input terminal of the voltage comparator COMP1, and the current sense signal Vs is inputted into the COMP1. An output signal V1 is outputted from the voltage comparator COMP1. Additionally, a clock signal CLK is outputted from an oscillator OSC. An output terminal of the voltage comparator COMP1 and output terminal of the oscillator OSC are connected to a status control circuit SC. Output terminals Q1 and Q2 of the status control circuit SC are connected to the output terminals DH1 and DH2 respectively, and output terminals *Q1 and *Q2 are connected to the output terminals DL1 and DL2 respectively. Control signals VQ1, *VQ1, VQ2 and *VQ2 are outputted from the output terminals Q1, *Q1, Q2 and *Q2 respectively. The status control circuit SC controls the control signals VQ1, *VQ1, VQ2 and *VQ2 in accordance with the clock signal CLK and output signal V1.

Operation of the DC-DC converter 1 will be described. In the DC-DC converter 1, as shown in FIG. 2 to FIG. 4, the states (1), (2) and (3) are obtained in accordance with combinations of ON and OFF of the transistors FET1, FET2, FET3 and FET4.

When the control signal VQ1 and VQ2 are high-level, and *VQ1 and *VQ2 are low-level, the transistors FET1 and FET3 are ON, and the FET2 and FET4 are OFF. Accordingly, as shown in FIG. 2, the terminal Tx of the choke coil L1 is connected to the input terminal Tin, the terminal Ty is connected to the reference potential, and the state (1) is obtained. In the state (1), energy is accumulated into the choke coil L1 from the input terminal Tin side, and the inductor current IL increases at a constant steep slope with passage of time. At this time, where an inductance value of the choke coil L1 is defined as L, an increasing slope is calculated by (Vin/L).

When the control signal *VQ1 and *VQ2 are high-level, and VQ1 and VQ2 are low-level, the transistors FET1 and FET3 are OFF, and the FET2 and FET4 are ON. Accordingly, as shown in FIG. 3, the terminal Tx of the choke coil L1 is connected to the reference potential, the terminal Ty is connected to the output terminal Tout, and the state (2) is obtained. In the state (2), the energy is discharged from the choke coil L1 to the output terminal Tout side, and the inductor current IL decreases at a constant steep slope with passage of time. At this time, a decreasing slope is calculated by −(Vout/L).

When the control signal VQ1 and *VQ2 are high-level, and *VQ1 and VQ2 are low-level, the transistors FET1 and FET4 are ON, and the FET2 and FET3 are OFF. Accordingly, as shown in FIG. 4, the terminal Tx of the choke coil L1 is connected to the input terminal Tin, the terminal Ty is connected to the output terminal Tout, and the state (3) is obtained. In the state (3), when the input voltage Vin is higher than the output voltage Vout, the energy from the input terminal Tin side is accumulated into the choke coil L1, and simultaneously supplied to the output terminal Tout side, and the inductor current IL increases at the constant slope with passage of time. On the other hand, when the input voltage Vin is lower than the output voltage Vout, the energy is discharged from the choke coil L1 to the output terminal Tout side, and the inductor current IL decreases at the constant slope with passage of time. At this time, increasing and decreasing slopes of the inductor current IL in the state (3) are smaller than the increasing slope in the state (1) and the decreasing slope in the state (2) respectively. Additionally, when the input voltage Vin approaches the output voltage Vout, the increasing/decreasing slope of the inductor current IL in the state (3) becomes zero.

Figure 6:
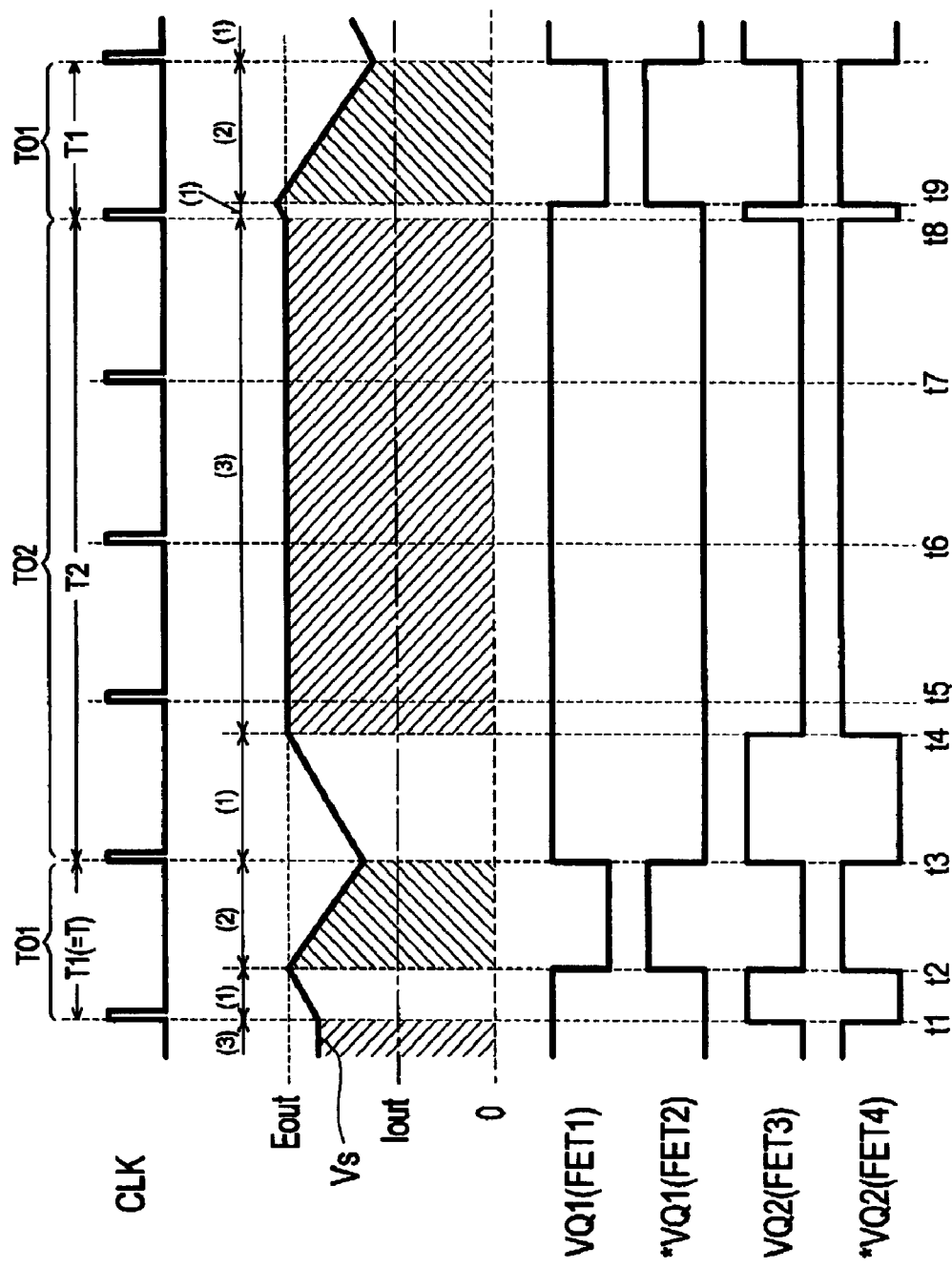
FIG. 6 is a waveform diagram of the DC-DC converter 1 of the first embodiment.

Operation of the DC-DC converter 1 in a first embodiment will be described with reference to FIG. 5 and FIG. 6. In the first embodiment, as shown in a state transition diagram of FIG. 5, a first period operation TO1 is constituted by the state (1) and state (2), and a second period operation TO2 is constituted by the state (1) and state (3). The states (1), (2), (1), (3), (1), . . . are repeated in this order, and the first period operation TO1 and second period operation TO2 are alternately repeated.

The operation of the DC-DC converter 1 in the first embodiment will be described with reference to a waveform diagram of FIG. 6. The clock signal CLK includes a clock pulse having a base period T. An output current Iout is an average of the inductor currents that flows in state2 and state3. Here, a period, in which the first period operation TO1 is performed, is defined as a first period T1, and a period, in which the second period operation TO2 is performed, is defined as a second period T2. The first period T1 is made equal to the base period T of the clock signal CLK, and the second period T2 is made a value n times as long as the first period T1. Here, n is a natural number of 2 or more, and is defined as a predetermined value in accordance with, for example, fluctuation of a load or relationship between the input voltage Vin and output voltage Vout. The case of n=4 will be described in the present embodiment. Additionally, operation when the input voltage Vin approaches a value approximately equal to the output voltage Vout and a slope of the current sense signal Vs in the state (3) is approximately zero will be described in the present embodiment.

The first period operation TO1 will be described. At time t1 (FIG. 6), the status control circuit SC makes the control signal *VQ2 transition to low-level and the control signal VQ1 transition to high-level, in accordance with a rising edge of the clock pulse of the clock signal CLK. Therefore, the state (1) is set, and the first period operation TO1 is started. In the state (1), since the choke coil L1 receives the energy from the input side with it blocked from the output side, the current sense signal Vs increases at the steep slope.

At time t2, when the current sense signal Vs reaches the output signal Eout, the output signal V1 of the voltage comparator COMP1 transitions from high-level to low-level. The status control circuit SC makes the control signals VQ1 and VQ2 transition to low-level and the control signals *VQ1 and *VQ2 transition to high-level, in accordance with input of a low-level output signal V1. Therefore, the state (1) is switched to the state (2). In the state (2), since the choke coil L1 is blocked from the input side and simultaneously connected to the output side, the current sense signal Vs decreases at the steep slope. Then, the state (2) is maintained until next clock signal CLK is inputted.

Next, the second period operation TO2 will be described. At time t3, the status control circuit SC makes the control signals VQ1 and VQ2 transition to high-level and the control signals *VQ1 and *VQ2 transition to low-level, in accordance with the rising edge of the clock pulse of the clock signal CLK. Therefore, the state (2) is switched to the state (1). Thus, the first period operation TO1 ends, and the second period operation TO2 is started. In the state (1), the current sense signal Vs increases at the steep slope.

At time t4, when the current sense signal Vs reaches the output signal Eout, the output signal V1 of the voltage comparator COMP1 transitions from high-level to low-level. The status control circuit SC makes the control signal VQ2 transition to low-level and the control signal *VQ2 transition to high-level, in accordance with input of the low-level output signal V1. Therefore, the state (1) is switched to the state (3).

Then, the state (3) is maintained until the second period T2 passes. In the state (3), since the input voltage Vin approaches the output voltage Vout, as shown in FIG. 6, a slope of the current sense signal Vs is approximately zero. Therefore, the current sense signal Vs approximately keeps a value at time t4 constant. Thus, during the state (3), approximately maximum current is maintained in the choke coil L1.

At time t8, the second period T2 ends. Then, the status control circuit SC makes the control signal *VQ2 transition to low-level and the control signal VQ2 transition to high-level, in accordance with the rising edge of the clock signal CLK. Therefore, the state (3) is switched to the state (1). Thus, the second period operation TO2 ends, and the first period operation TO1 is started.

In the state (1) of the first period operation TO1, the current sense signal Vs increases at the steep slope. Here, during the term of the state (3) in the preceding second period T2, a maximum current sense signal Vs is maintained. Therefore, since the current sense signal Vs reaches the output signal Eout at time t8, the state (1) is switched to the state (2) at time t9 after the minimum on-pulse term.

The states (1), (2), (1), (3), (1), . . . are thus repeated in this order, and the first period operation TO1 and second period operation TO2 are alternately repeated. Then, in a region shown by diagonal lines in FIG. 6, the energy is supplied to the output terminal Tout side so that the inductor currents is supplied to the load and accumulated to the output capacitor C1.

Additionally, the number of switching times per unit time will be described with reference to FIG. 6. Here, the switching in the embodiment is defined as the number of times where each of the transistors FET1, FET2, FET3 and FET4 is turned OFF, ON, OFF in this order, or turned ON, OFF, ON in this order. Therefore, there exist two transitions of the conductive state in one switching. In the operation of FIG. 6 according to the first embodiment, the switching is performed once for the transistors FET1 and FET2 in a period (=(n+1)×

T) that is the total of the first period T1 and second period T2. That is, the number of switching times SC1 per the unit time of each of the transistors FET1 and FET2 is represented by the following expression.

$$SC1=1/((n+1)\times T)\text{(times/sec)} \quad \text{Expression (1)}$$

Similarly, the switching is performed twice for the transistors FET3 and FET4 in the period (=(n+1)×T) that is the total of the first period T1 and second period T2. That is, the number of switching times SC2 per the unit time of each of the transistor FET3 and FET4 is represented by the following expression.

$$SC2=2/((n+1)\times T)\text{(times/sec)} \quad \text{Expression (2)}$$

Accordingly, the average number of switching times ASC per one transistor is represented by the following expression.

$$ASC=1.5/((n+1)\times T)\text{(times/sec)} \quad \text{Expression (3)}$$

Figure 7:
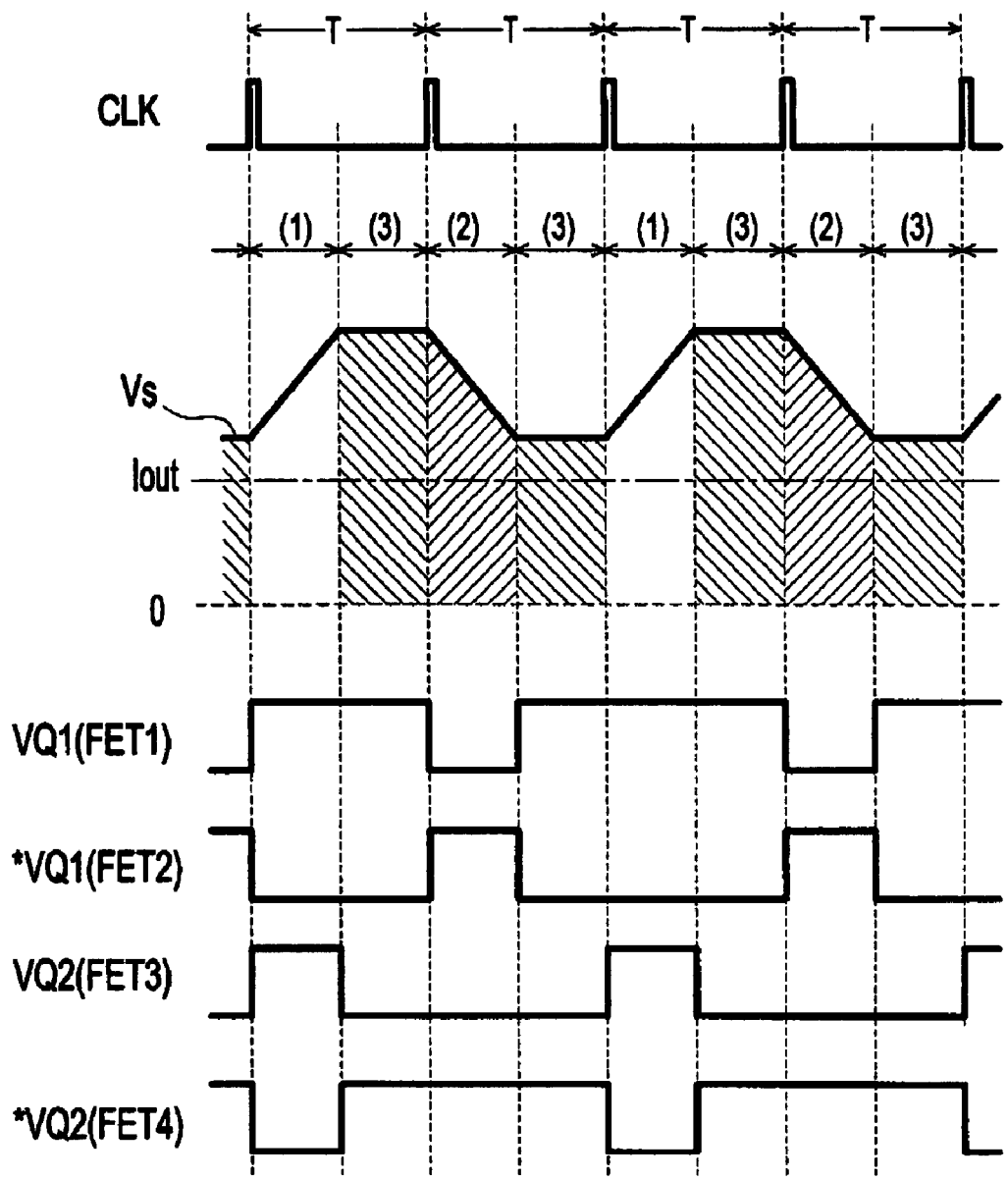
FIG. 7 is a waveform diagram showing a conventional circuit operation.

On the other hand, an example of a conventional circuit operation is shown in FIG. 7. In the conventional circuit operation, the transistors FET1, FET2, FET3 and FET4 do not operate in two kinds of periods but do operate in the same base period T. Therefore, the transistors are not controlled over a plurality of clock cycles of the clock signal CLK. In this case, the switching is performed once for the transistors FET1, FET2, FET3 and FET4 in two periods (=2×T). That is, the number of switching times PSC per the unit time of each of transistors FET1, FET2, FET3 and FET4 is represented by the following expression.

$$PSC=1/(2\times T)\text{(times/sec)} \quad \text{Expression (4)}$$

Accordingly, the expressions (3) and (4) reveal that when $n \geqq 3$, the average number of switching times ASC of the first embodiment is smaller than the conventional number of switching times PSC.

As in the above detailed description, in the DC-DC converter 1 according to the first embodiment, the state (1) is switched to the state (3) in the second period operation TO2 so that the increasing slope of the inductor current IL is reduced. Therefore, since the peak-to-peak current value of the inductor current IL can be prevented from increasing regardless of the length of the second period T2 of the second period operation TO2, the second period T2 of the second period operation TO2 can be made longer than the first period T1 of the first period operation TO1. Here, since the first period T1 is one clock cycle of the clock signal CLK, multi-clock control for controlling the transistors over the plurality of clock cycles of the clock signal CLK can be realized by making the second period T2 longer than the first period T1. Since the average switching frequency of the transistors FET1, FET2, FET3 and FET4 can be thus reduced, switching driving loss generated in switching on/off and conduction loss of the switch in a transitional state in switching ON (OFF) to OFF (ON) can be reduced. Therefore, efficiency of the DC-DC converter can be enhanced.

Figure 8:
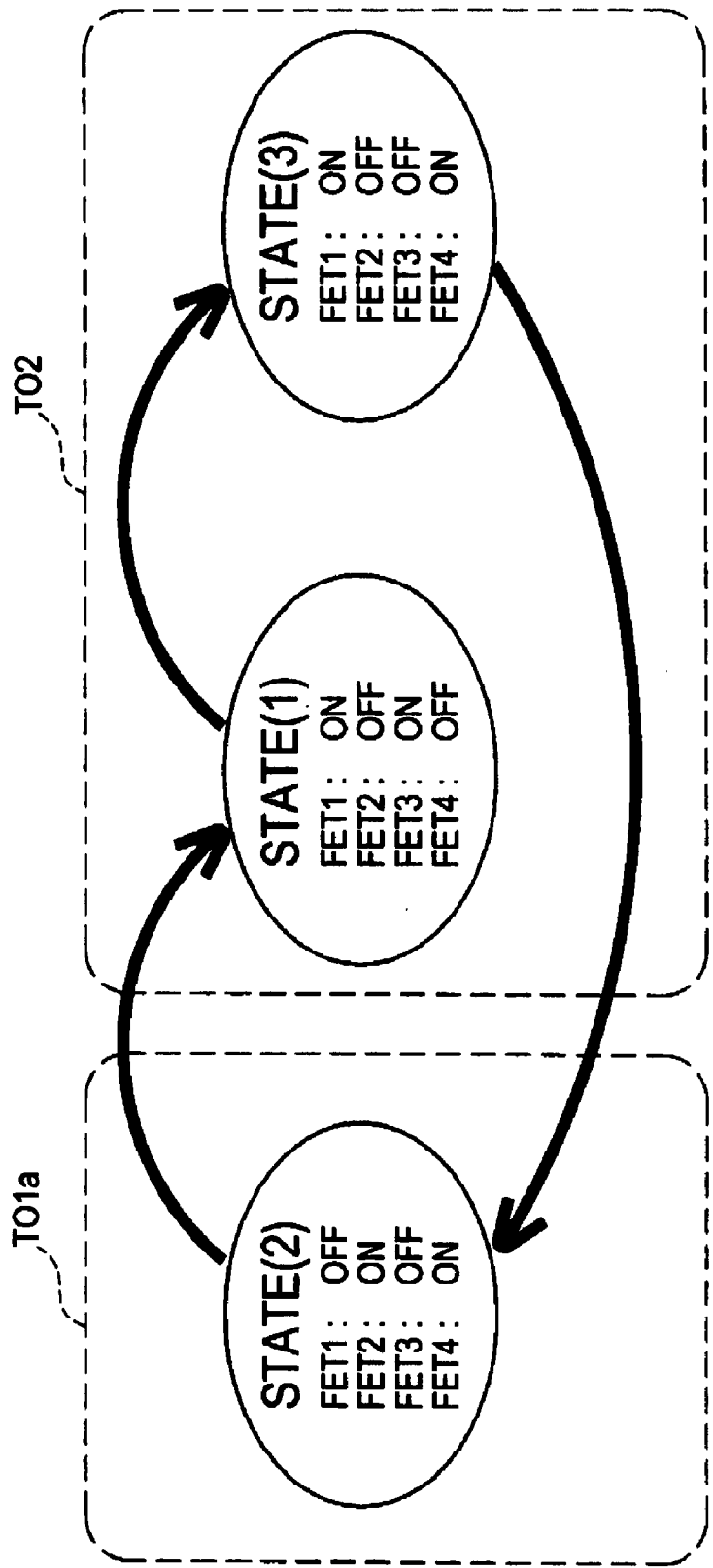
FIG. 8 is a state transition diagram of a second embodiment.
Figure 9:
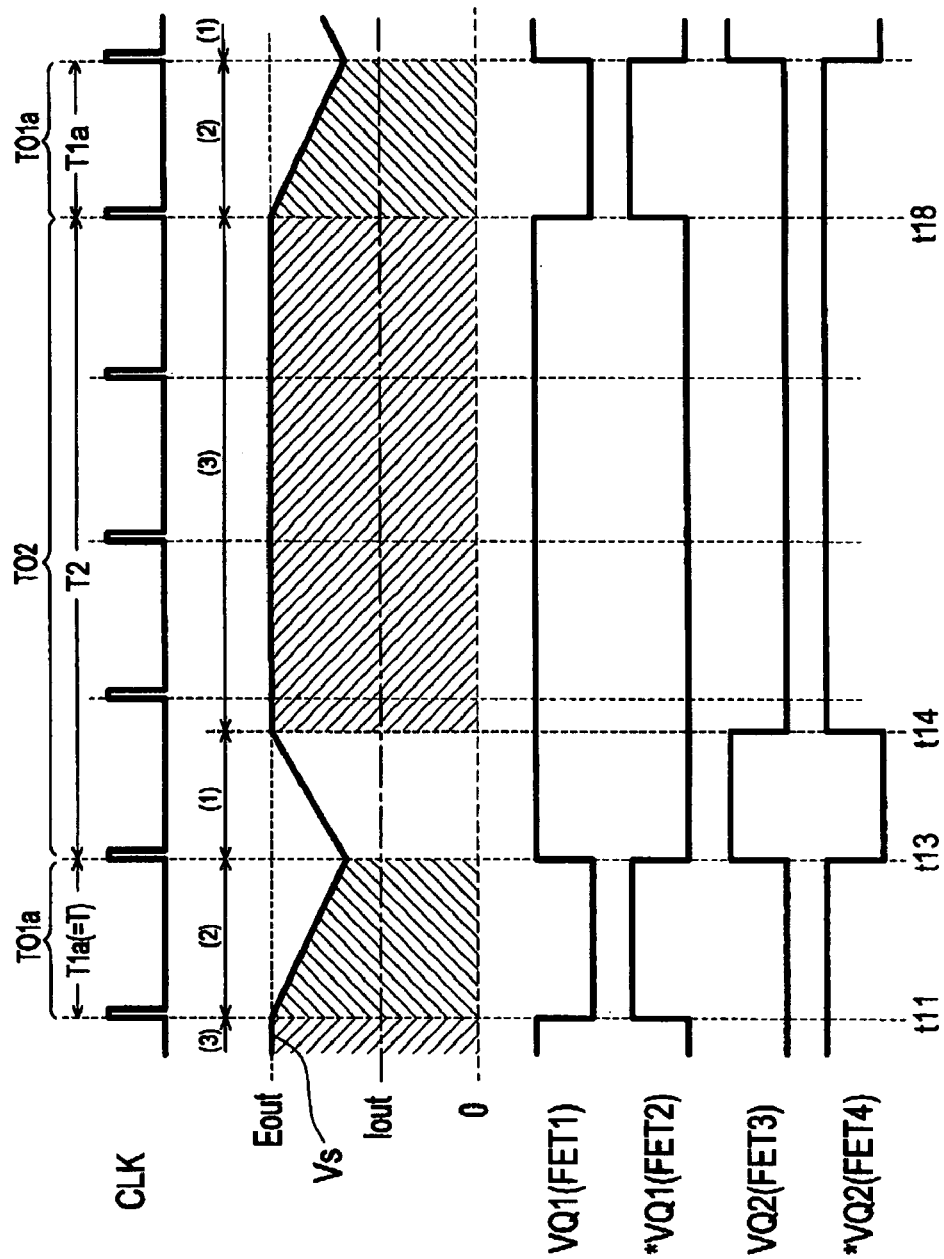
FIG. 9 is a waveform diagram of the DC-DC converter 1 of the second embodiment.

Operation of the DC-DC converter 1 in a second embodiment will be described with reference to FIG. 8 and FIG. 9. In the second embodiment, a first period operation TO1a is employed in place of the first period operation TO1 of the first embodiment. As shown in a state transition diagram of FIG. 8, the first period operation TO1a is constituted by the state (2), and the second period operation TO2 is constituted by the states (1) and (3). The states (1), (3), (2), (1), . . . are repeated in this order, and the first period operation TO1a and second period operation TO2 are alternately repeated.

The operation of the DC-DC converter 1 in the second embodiment will be described with reference to a waveform diagram of FIG. 9. Here, a period, in which the first period operation TO1a is performed, is defined as a first period T1a. The first period T1a is made equal to the base period T of the clock signal CLK. Moreover, since the other constitutions are the same as those of the first embodiment, a detailed description will be omitted.

The first period operation TO1a will be described. At time t11, the status control circuit SC makes the control signal VQ1 transition to low-level and the control signal *VQ1 transition to high-level, in accordance with the rising edge of the clock pulse of the clock signal CLK. Therefore, the state (2) is set, and the first period operation TO1a is started. In the state (2), the current sense signal Vs decreases at a steep slope. Then, the state (2) is maintained until next clock signal CLK is inputted. Thus, a term of the state (2) is fixed to the predetermined base period T in the first period T1a.

Next, the second period operation TO2 will be described. At time t13, the status control circuit SC makes the control signals VQ1 and VQ2 transition to high-level and the control signals *VQ1 and *VQ2 transition to low-level, in accordance with the rising edge of the clock pulse of the clock signal CLK. Therefore, the state (2) is switched to the state (1). Thus, the first period operation TO1a ends, and the second period operation TO2 is started. In the state (1), the current sense signal Vs increases at the steep slope.

At time t14, when the current sense signal Vs reaches the output signal Eout, the status control circuit SC makes the control signal VQ2 transition to low-level and the control signal *VQ2 transition to high-level, in accordance with input of the high-level output signal V1. Therefore, the state (1) is switched to the state (3). Then, the state (3) is maintained until the second period T2 passes. In the state (3), since the input voltage Vin approaches the output voltage Vout, the slope of the current sense signal Vs is approximately zero as shown in FIG. 9.

At time t18, the second period T2 ends. The status control circuit SC makes the control signal VQ1 transition to low-level and the control signal *VQ1 transition to high-level, in accordance with the rising edge of the clock signal CLK. Therefore, the state (3) is switched to the state (2). Thus, the second period operation TO2 ends, and the first period operation TO1a is started.

The states (2), (1), (3), (2), . . . are thus repeated in this order, and the first period operation TO1a and second period operation TO2 are alternately repeated. Then, in a region shown by diagonal lines in FIG. 9, the energy is supplied to the output terminal Tout side so that the inductor currents can be supplied to the load and accumulated to the output capacitor C1.

Additionally, the number of switching times per the unit time will be described with reference to FIG. 9. In the operation of FIG. 9 according to the second embodiment, the switching is performed once for the transistors FET1, FET2, FET3 and FET4 in the period (=(n+1)×T) that is the total of the first period T1a and second period T2. That is, the number of switching times SCa per the unit time of each of the transistors FET1, FET2, FET3 and FET4 is represented by the following expression.

$$SCa=1/((n+1)\times T)\text{(times/sec)} \quad \text{Expression (5)}$$

Accordingly, the expressions (3) and (5) reveal that when $n \geqq 2$, the number of switching times SCa becomes smaller than the conventional number of switching times PSC.

As in the above detailed description, in the DC-DC converter 1 according to the second embodiment, the first period operation TO1a is constituted by only the state (2), and the state (2) is maintained during the base period T. Additionally, in the second period operation TO2, the state (1) is switched to the state (3) so that the increasing slope of the inductor current IL is reduced. Thus, the peak-to-peak current value of the inductor current IL is prevented from increasing, and simultaneously, the numbers of switching times of the FET3 and FET4 can be reduced. Therefore, the efficiency of the DC-DC converter can be enhanced.

Figure 10:
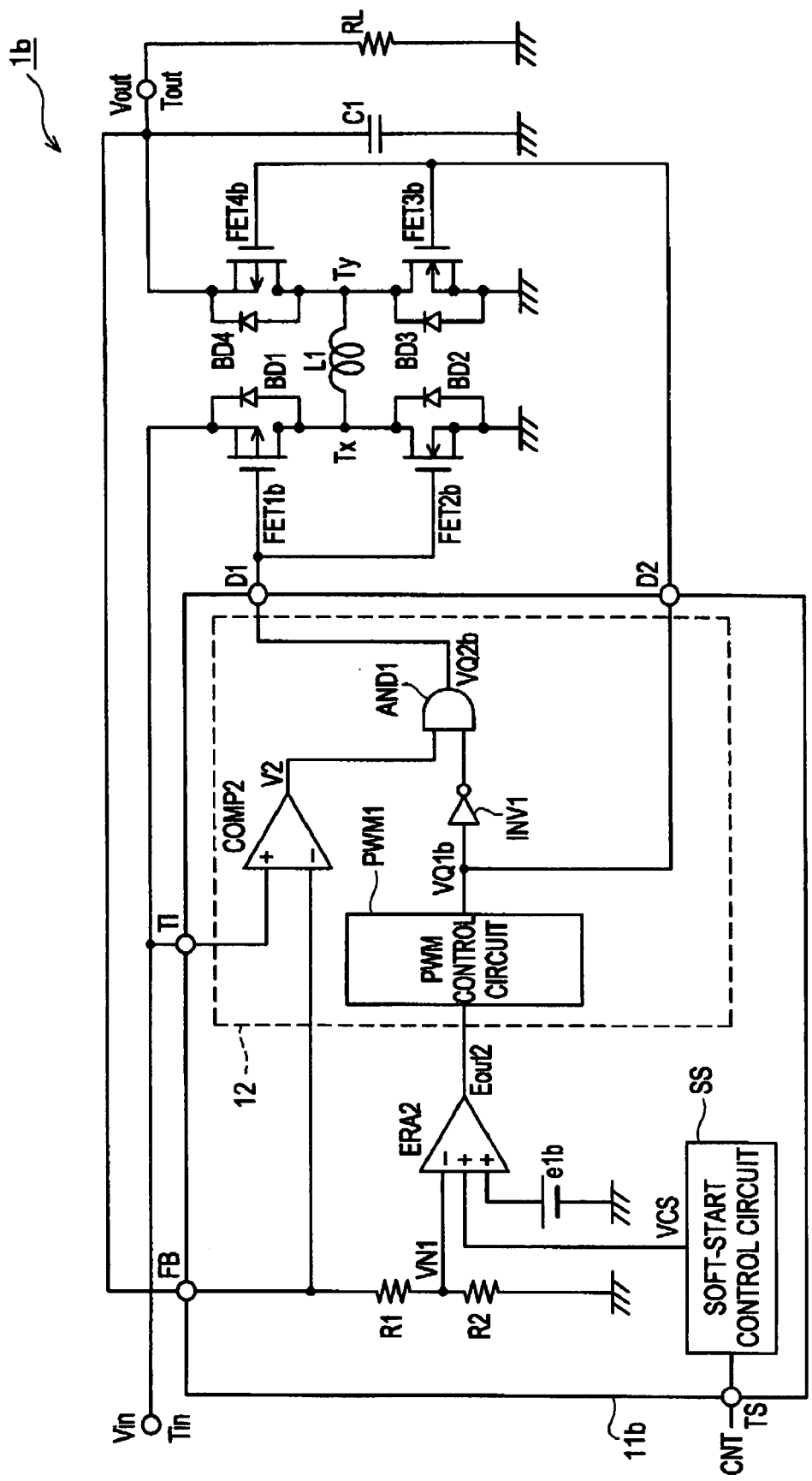
FIG. 10 is a circuit diagram of a DC-DC converter 1b.
Figure 11:
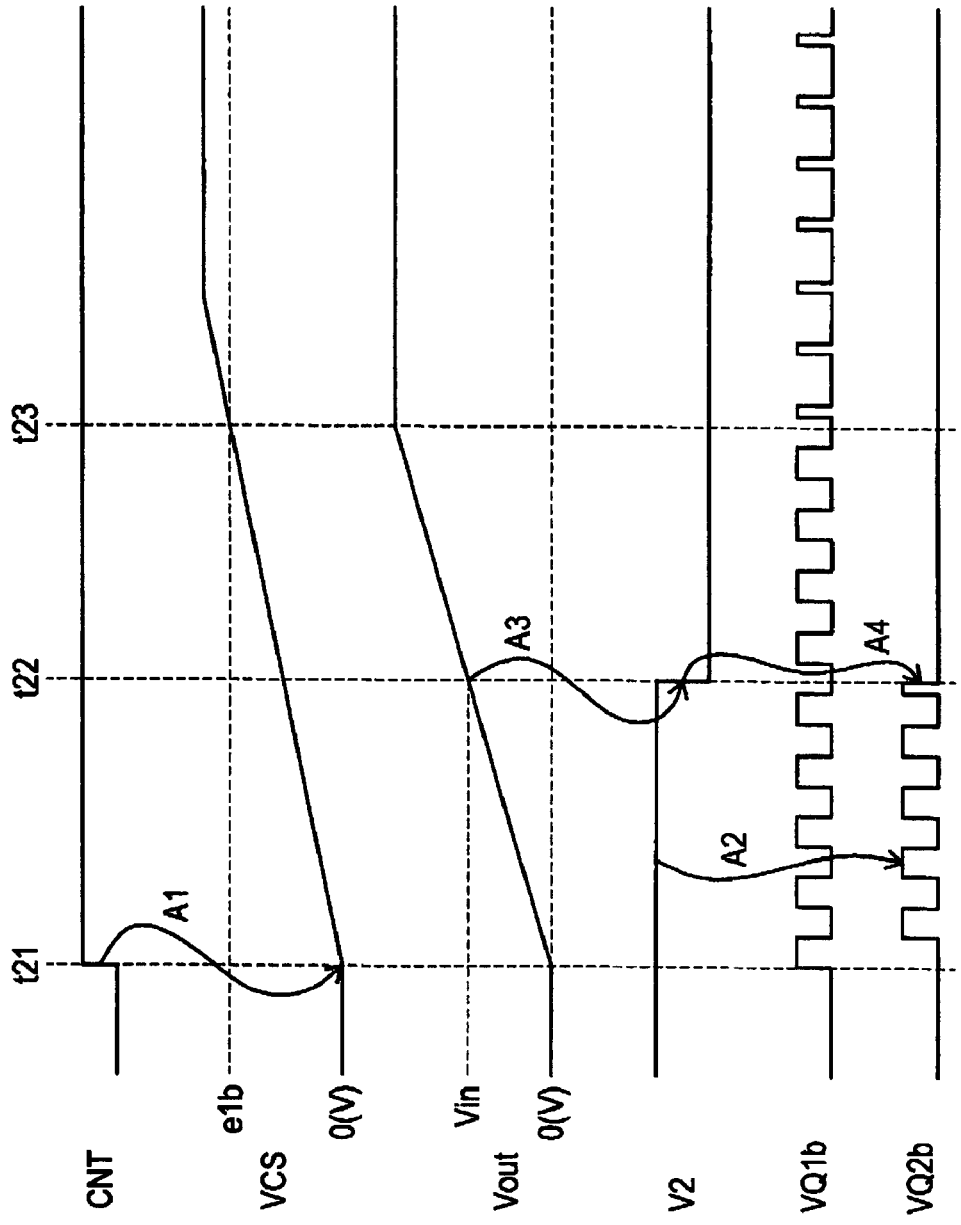
FIG. 11 is waveform diagram of the DC-DC converter 1b of a third embodiment.
Figure 12:
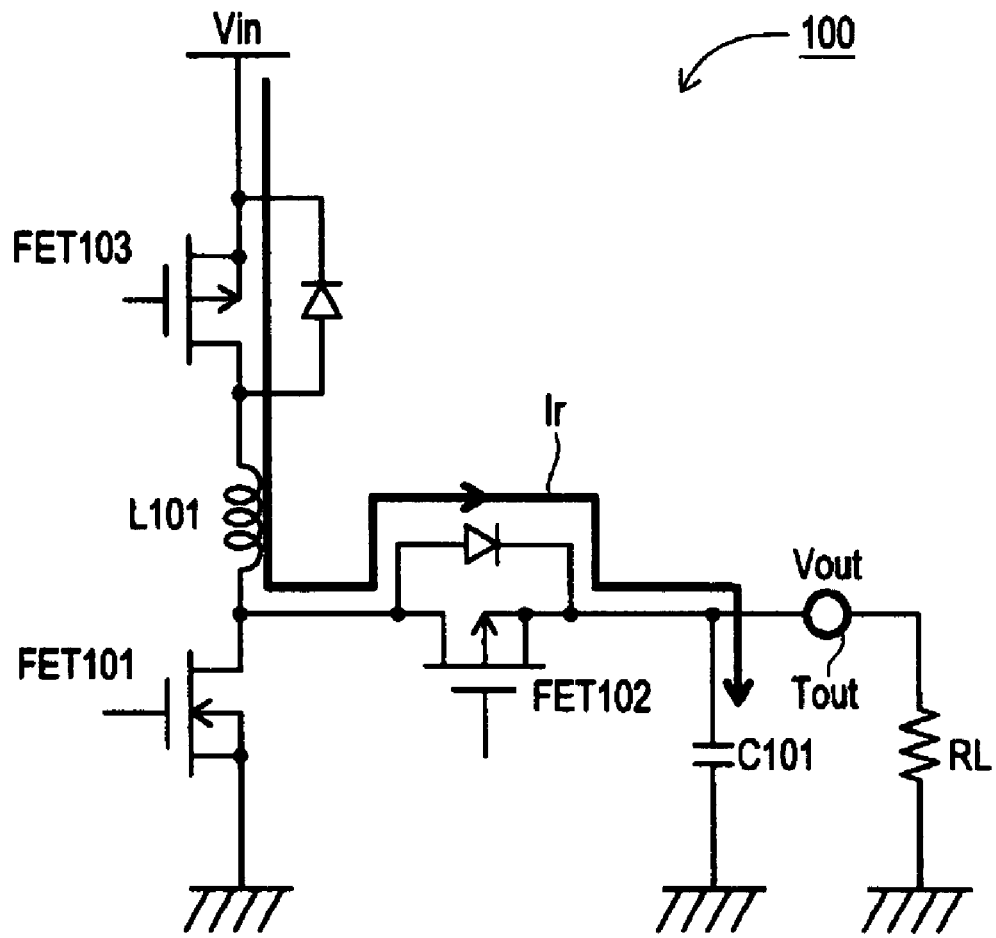
FIG. 12 is a circuit diagram of conventional DC-DC converter 100.

Operation of a DC-DC converter 1b in a third embodiment will be described with reference to FIG. 10 and FIG. 11. FIG. 10 shows a circuit diagram of the DC-DC converter 1b in the third embodiment. The DC-DC converter 1b has the structure of, so-called, an H-bridge type switching regulator including P-type transistors FET1b and FET4b and N-type transistors FET2b and FET3b. The transistors FET1b, FET2b, FET3b and FET4b are equipped with body diodes BD1, BD2, BD3 and BD4, respectively. Forward direction of the body diode BD1 is From a terminal Tx to an input terminal Tin, that of the body diode BD2 is from a reference potential to the terminal Tx, that of the body diode BD3 is from the reference potential to a terminal Ty, and that of the BD4 is from the terminal Ty to an output terminal Tout. Furthermore, one of terminals of a load RL is connected to the output terminal Tout and the other is connected to the reference potential.

A control circuit 11b comprises resistance elements R1 and R2, a soft-start control circuit SS, an error amplifier ERA2 and a switching control circuit 12. An operation control signal CNT is inputted to the soft-start control circuit SS through an input terminal TS and a soft-start signal VCS is outputted from there. A connection point of the resistance elements R1 and R2 is connected to an inversion input terminal of the error amplifier ERA2 from which a divided voltage VN1 is inputted. A reference voltage e1b is connected to a first non-inversion input terminal of the error amplifier ERA2 and a soft-start signal VCS is inputted to its second non-inversion imputer terminal. The error amplifier ERA2 amplifies error between either the reference voltage e1b or soft-start signal VCS, whichever is lower, and the divided voltage VN1 to output an output signal Eout2.

The switching control circuit 12 comprises a PWM control circuit PWM1, a voltage comparator COMP2, an inverter INV1 and an AND circuit AND. An output voltage Vout is inputted to an inversion input terminal of the voltage comparator COMP2 and an input voltage Vin is inputted to its non-inversion input terminal through an input terminal TI. An output signal V2 outputted from the voltage comparator COMP2 is inputted to the AND circuit AND1. Furthermore, an output signal Eout2 is inputted to the PWM control circuit PWM1. A control signal VQ1b outputted from the PWM control circuit PWM1 is inputted to gate terminals of the transistors FET3b and FET4b through the output terminal D2, inverted at the inverter INV1, and then inputted to the AND circuit AND1. A control signal VQ2b outputted from the AND circuit AND1 is inputted to gate terminals of the transistors FET1b and FET2b through the output terminal D1. Since other parts of the structure in the DC-DC converter 1b is same as the DC-DC converter 1 of the first embodiment, detailed description of it will be omitted.

The operation of the DC-DC converter 1b will be described with reference to a waveform diagram of FIG. 11. When an operation control signal CNT inputted from a not-shown CPU or the like is set in high-level, the control circuit 11b makes the DC-DC converter 1b start soft-start operation. When the operation control signal CNT is set in low-level, the control circuit 11b stops operation of the DC-DC converter 1b. It is to be noted that soft-start operation is an operation to step up the output voltage Vout up to a predetermined set voltage from zero when the DC-DC converter 1b starts up.

Here will be described operation-stop of the DC-DC converter 1b before time t21. On a current path from an input terminal Tin to an output terminal Tout, the transistors FET1b and FET4b are arranged. When operation of the DC-DC converter is stopped, all of the transistors FET1b through FET4b are kept OFF. Furthermore, the polarity of the body diode BD1 is made inverse, forwarding to the output terminal Tout from the input terminal Tin. Therefore, the current path from the input terminal Tin to the output terminal Tout is blocked by the transistor FET1b. Thus, there can be prevented occurrence of dark current which flows from the input terminal Tin to the output terminal Tout when the DC-DC converter 1b stops operation. Furthermore, by avoiding dark current, the output voltage Vout can be kept 0 (V) when operation of the DC-Dc converter 1b is stopped.

There will be described operation of the DC-DC converter 1b at the time of start-up. When an operation control signal CNT makes transition from low-level to high-level at time t21, the DC-Dc converter 1b is started up. In response to the high-level transition of the operation control signal CNT, a soft-start signal VCS outputted from the soft start control circuit SS steps up from 0V gradually (arrow A1). During a term from time t21 to time t23, the soft-start signal VCS is lower than the reference voltage e1b. Therefore, the error amplifier ERA2 amplifies a difference between the soft-start signal VCS and the divided voltage VN1.

The PWM control circuit PWM1 compares triangular wave generated internally and an output signal Eout2. In case the output signal Eout2 is higher than the triangular wave, the PWM control circuit PWM1 outputs a high-level control signal VQ1b. Accordingly, the PWM control circuit PWM1 carries out operation as an output-voltage-pulse-width converter for outputting pulses having pulse width depending on level of the output signal Eout2.

There will be described operation during a term from time t21 to time t22 in which the output voltage Vout is lower than the input voltage Vin. During that term, a high-level output signal V2 is outputted from the voltage comparator COMP2 and then, inputted to the AND circuit AND1. Sequentially, the AND circuit AND1 allows an output signal of the inverter INV1 to pass and outputs it as a control signal VQ2b (arrow A2).

While the control signal VQ1b and the control signal VQ2b are in high-level and low-level, respectively, the transistors FET1b and FET3b are set ON and the transistors FET2b and FET4b are set OFF. Therefore, as shown in FIG. 2, the terminals Tx and Ty of the choke coil L1 are connected to the input terminal Tin and the reference potential, respectively and it turns into state (1). In the state (1), the energy is accumulated into the choke coil L1 from the input terminal Tin side.

On the other hand, while the control signal VQ1b and the controls signal VQ2b are in low-level and high-level, respectively, the transistors FET1b and FET3b are set OFF and the transistors FET2b and FET4b are set ON. Therefore, as shown in FIG. 3, the terminals Tx and Ty of the choke coil L1 are connected to the reference potential and the output terminal Tout, respectively and it turns into state (2). In the state (2), the energy is discharged to the output terminal Tout side from the choke coil L1.

Since the states (1) and (2) are repeated alternately during the term of time t21 to time t22, step-up/step-down operation is carried out. With the step-up/step-down operation being carried out, the transistors FET1b and FET4b never get conductive simultaneously. That is, this prevents the input voltage Vin and the output voltage Vout from getting conductive directly. Consequently, this makes it possible to prevent rush current from flowing to the output capacitor C1 from the input voltage Vin. Since the output voltage Vout is prevented from stepping up to the input voltage Vin rapidly, the output voltage Vout steps up gradually along rise of a soft-start signal VCS. That is, the soft-start operation can be realized in the DC-DC converter $1b$.

Next, there will be described operation during a term after time t22 in which the output voltage Vout is higher than the input voltage Vin. When the output signal V2 reaches the input voltage Vin at time t22, the output signal V2 gets inverted from high-level to low-level in the voltage comparator COMP2 (arrow A3). Since the AND circuit AND1 masks the output signal of the inverter INV1 in response to an input of a low-level output signal V2, the control signal VQ2$b$ of the AND signal AND1 is fixed to low-level (arrow A4). Consequently, since the transistors FET1$b$ and FET2$b$ are fixed to ON-setting and OFF-setting, respectively, the terminal Tx of the choke coil L1 is fixed while being connected to the input terminal Tin.

While the control signal VQ1$b$ is in high-level, the transistors FET3$b$ and FET4$b$ are set ON and OFF, respectively. Therefore, the terminal Ty is connected to the reference potential and the energy is accumulated into the choke coil L1 from the input terminal Tin side. While the control signal VQ1$b$ is in low-level, the transistors FET3$b$ and FET4$b$ are set OFF and ON, respectively. Therefore, the terminal Ty is connected to the output terminal Tout side and the energy is discharged to the output terminal Tout side from the choke coil L1. Therefore, in the term after time t22, a step-up converter is constituted by the transistors FET3$b$ and FET4$b$ and the choke coil L1 and step-up operation is carried out. It is to be noted that switching duty of the transistors FET3$b$ and FET4$b$ are determined depending on level of an output signal Eout2 from the error amplifier ERA2.

In the step-up operation, the transistors FET1$b$ and FET4$b$ get conductive simultaneously and the input voltage Vin and the output voltage Vout get conductive to each other directly when the control signal VQ1$b$ is in low-level. There is consequently formed a current path to reach the output capacitor C1 from the input voltage Vin through the transistor FET1$b$, the choke coil L1 and the transistor FET4$b$. Therefore, in case the step-up operation is carried out during a term where the output voltage Vout is lower than the input voltage Vin, rush current flows from the input voltage Vin to the output capacitor C1. However, with the DC-DC converter $1b$ in the third embodiment, step-up/step-down operation, but not step-up operation, is carried out during the term where the output voltage Vout is lower than the input voltage Vin. Since a current path from the input voltage Vin to the output capacitor C1 is not formed with the step-up/step-down operation, flow of rush current can be prevented. Therefore, output voltage Vout is prevented from stepping up to the input voltage Vin rapidly and the soft-start operation can be realized.

Furthermore, with the DC-DC converter $1b$ in the third embodiment, step-up/step-down operation is switched to step-up operation after a lapse of time t22 at which the output voltage Vout becomes higher than the input voltage Vin. Accordingly, since the number of switching-operation-subject transistors can be reduced from four to two while rush current is avoided, switching loss can be reduced.

As described, the inventive DC-DC converter $1b$ can avoid occurrence of dark current when its operation is stopped. Furthermore, at a term where the output voltage is lower than the input voltage when the DC-DC converter $1b$ is started-up, step-up/step-down operation is carried out, whereby the soft-start operation can be carried out. Furthermore, at a term where the output voltage is higher than the input voltage when the DC-DC converter $1b$ is started-up, step-up operation is carried out, whereby switching loss can be reduced. Thus, there can be provided a dark-current-preventive step-up type DC-DC converter capable of realizing prevention of rush current and output lamp control.

Moreover, as a matter of course, the present invention is not limited to the embodiments, and various improvements and modifications can be made without departing from the scope of the present invention. Although the first embodiment is described above, in which the input voltage Vin approaches the output voltage Vout and the slope of the current sense signal Vs in the state (3) is approximately zero, the present invention is not limited to this embodiment. When the input voltage Vin is higher than the output voltage Vout, the current sense signal Vs increases at the constant slope in the state (3). Since the current sense signal Vs reaches the output signal Eout at the end of the second period T2, the term of the state (1) in the first period T1 following the second period T2 becomes a minimum on-pulse term. On the other hand, when the input voltage Vin is lower than the output voltage Vout, the current sense signal Vs decreases at the constant slope in the state (3). Since the current sense signal Vs is lower than the output signal Eout at the end of the second period T2, the term of the state (1) in the first period T1 following the second period T2 is made as a term until the current sense signal Vs reaches the output signal Eout. Therefore, the operation of the first embodiment can be realized in both the above cases. Moreover, as a matter of course, the operation of the second embodiment of the present invention can similarly be realized even in both the cases where the input voltage Vin is higher or lower than the output voltage Vout, as a matter of course.

Additionally, the first period T1 is made equal to the base period T in the embodiment, however, T may differ from the base period T.

Additionally, although the second period T2 is set as a value n times as long as the first period T1 and n as a values is set as a natural number of 2 or more in the embodiment, the present invention is not limited to this embodiment. A real number of one or more may be substituted for n. For example, when the first period T1 is obtained by applying frequency division to the base period T, a real number can be substituted for n. In this case, assuming that the first period T1 is obtained by applying ½-frequency division to the base period T and the second period T2 is obtained by applying ⅕-frequency division to the base period T, the second period T2 is 2.5 times as long as the first period T1. Even if the period itself of the clock signal CLK is modulated between the first period T1 and second period T2, as a matter of course, a real number can be substituted for n.

Additionally, in the embodiment, a compensation signal may be applied to the current sense signal Vs and output signal Eout for control stabilization, as a matter of course.

Additionally, although the second period T2 is set as a fixed value having a period four times as long as the first period T1 in the embodiment, the present invention is not limited to this embodiment. As a matter of course, the second period T2 can be dynamically subjected to variable control in accordance with a relationship between the input voltage and output voltage, and change of output load. For example, when the second period T2 is subjected to the variable control to be reduced in accordance with generation of the change of output load, the term of the state (3) can be reduced, and therefore follow-up property of the DC-DC converter can be enhanced. Additionally, when the second period T2 is dynamically subjected to the variable control to be increased in accordance with a reduction in a difference voltage between the input voltage Vin and output voltage Vout, and to be reduced in accordance with an increase in the difference voltage, the number of switching times can be further reduced.

Additionally, although the existence ratio of the first period operation TO1 and second period operation TO2 is set as 1:1 in the first embodiment, the present invention is not limited to this embodiment. As a matter of course, the existence ratio can be set as an arbitrary value. The existence ratio of the first period operation TO1 and second period operation TO2 is variably controlled so that the time ratio of the state (3) to the whole state can be adjusted. For example, when the existence ratio of the second period operation TO2 is reduced by repeating the first period operation TO1 and second period operation TO2 in an order of TO1, TO1, TO2, TO1, . . . , the same effect as shortening the term of the state (3) can be obtained.

Additionally, although the transistors FET2 and FET4 are employed as a synchronous-rectifying element in the embodiment, the present invention is not limited to this embodiment, and a diode element may be employed for rectification. For example, at least one of the transistors FET2 and FET4 may be replaced with the diode, or the diode may be connected in parallel with at least one of the transistors FET2 and FET4.

Additionally, although N-type FETs, FET1, FET2, FET3 and FET4 are employed in the embodiment as shown in FIG. 1, the present invention is not limited to this embodiment. Any of or all of the N-type FETs may be replaced with P-type FET(s), as a matter of course.

The current sense signal Vs is not limited to detecting the inductor current IL flowing through the choke coil L1, and may detect current flowing through at least one of the transistors FET1 and FET3.

In the first and second embodiments, the state (1) is switched to the state (3) in the second period operation TO2, and thus the increasing slope of the inductor current IL is reduced and the peak-to-peak current value can be prevented from increasing. However, the present invention is not limited to this embodiment. The state (2) may be switched to the state (3) so that the decreasing slope of the inductor current IL is reduced. Thus, a bottom current value of the inductor current IL can be prevented from decreasing, and the second period T2 can be made longer than the first period T1.

Additionally, although the clock signal CLK is used for the step-up/step-down type DC-DC converter in the first and second embodiments, the present invention is not limited to this embodiment. As long as the DC-DC converter is replaced with a step-down type DC-DC converter when the input voltage Vin is higher than the output voltage Vout, or is replaced with a step-up DC-DC converter when the input voltage Vin is lower than the output voltage Vout, the clock signal CLK can be commonly used for both the DC-DC converters.

Additionally, the control circuits 11 and 11b of the embodiment may be constituted by a single or a plurality of semiconductor chip(s), etc. Further, as a matter of course the, DC-DC converter 1 may be constituted by a single or a plurality of semiconductor chip(s), and may be constituted as a module.

Although the DC-DC converter 1b in the third embodiment is operated in accordance with voltage mode control, the manner of control is not restricted to this. Inventive point of the third embodiment is to switch operation between step-up/step-down operation and step-up operation depending on a result of comparison between an output voltage and an input voltage. Therefore, current mode control is applicable to the third embodiment, as a matter of course.

Although the transistors FET1b and FET4b in the third embodiment are P-type transistors, type of them is not restricted to this. Since polarity of the body diode of the transistor FET1b may be arranged such that forward direction should be from the terminal Tx to the input terminal Tin, an N-type transistor is applicable to the transistor FET1b, as a matter of course.

Although the soft-start operation carried out at the time of the DC-DC converter 1b being started up is described in the third embodiment, the manner of the soft-start operation is not restricted to this. It is possible to carry out soft-start control to make the output voltage Vout step-down from a predetermined set voltage to zero gradually when operation of the DC-DC converter 1b is terminated, as a matter of course. In that case, step-up operation may be carried out during a term in which the output voltage is higher than the input voltage, and the step-up operation may be switched to step-up/step-down operation when the output voltage becomes lower than the input voltage.

Moreover, the transistor FET1 is an example of a first switching element, transistor FET2 is an example of a first rectifying element, transistor FET4 is an example of a second rectifying element, transistor FET3 is an example of a second switching element, the choke coil L1 is an example of an inductance element, and the control circuit 11 is an example of a control part, respectively. Furthermore, the transistor FET1b is an example of a first switching element, the transistor FET2b is an example of a second switching element, the transistor FET3b is an example of a third switching element, the transistor FET4b is an example of a fourth switching element, the PWM control circuit is an example of a control signal generation circuit, the voltage comparator COMP2 is an example of a comparator, and the AND circuit AND1 is an example of a mask circuit.

According to the step-up/step-down type DC-DC converter and a control circuit and control method of the same of the present invention, firstly, a step-up/step-down type DC-DC converter in which a peak-to-peak current value of inductor current is suppressed and simultaneously an average switching frequency of switching elements can be reduced, and high efficiency can be realized can be provided. Secondly, a step-up/step-down type DC-DC converter capable of carrying out step-up operation while realizing soft-start control and prevention of dark current can be provided.

What is claimed is:

1. A control method of a step-up/step-down type DC-DC converter including: a first switching element connected between a voltage input terminal and one terminal of an inductance element; a first rectifying element connected between a reference potential and one terminal of the inductance element; a second rectifying element connected between a voltage output terminal and the other terminal of the inductance element; and a second switching element connected between the reference potential and the other terminal of the inductance element, the method comprising:

setting either one of a first state and a second state in a first cycle and, in case that the first state is set, switching from the first state to the second state when current of the inductance element reaches a given value in the first cycle; and setting the first state in a second cycle following the first cycle and switching from the first state to a third state when current of the inductance element reaches the given value in the second cycle, wherein in the first state, the first and second switching elements are ON;

wherein in the second state, the first and second switching elements are OFF;

wherein in the third state, the first switching element is ON and the second switching element is OFF;

wherein the first cycle includes a consecutive sequence of the first state and the second state, or includes the second state; and wherein the second cycle includes a consecutive sequence of the first state and the third state.

2. The control method of the step-up/step-down type DC-DC converter according to claim 1, wherein
the second cycle is n (n: a real number of one or more) times as long as the first cycle.

3. The control method of the step-up/step-down type DC-DC converter according to claim 2, wherein
the n is a natural number of 2 or more.

4. The control method of the step-up/step-down type DC-DC converter according to claim 1, wherein
the first rectifying element is a third switching element,
the second rectifying element is a fourth switching element,
the third and fourth switching elements are OFF in the first state,
the third and fourth switching elements are ON in the second state, and
the fourth switching element is ON, and the third switching element is OFF, in the third state.

5. A control circuit of a step-up/step-down type DC-DC converter, comprising:
a first switching element connected between a voltage input terminal and one terminal of an inductance element;
a first rectifying element connected between a reference potential and one terminal of the inductance element;
a second rectifying element connected between a voltage output terminal and the other terminal of the inductance element;
a second switching element connected between the reference potential and the other terminal of the inductance element; and
a control part for controlling: a first state where the first and second switching elements are ON; a second state where the first and second switching elements are OFF; and a third state where the first switching element is ON and the second switching element is OFF, wherein either one of the first state and the second state is set in a first cycle and, in case that the first state is set, the first state is switched to the second state when current of the inductance element reaches a given value in the first cycle, and wherein the first state is set in a second cycle following the first cycle and the first state is switched to the third state when current of the inductance element reaches the given value in the second cycle;
wherein the first cycle includes a consecutive sequence of the first state and the second state, or includes the second state; and
wherein the second cycle includes a consecutive sequence of the first state and the third state.

6. The control circuit of the step-up/step-down type DC-DC converter according to claim 5, the converter further comprising:
a third switching element as the first rectifying element, and
a fourth switching element as the second rectifying element,
wherein the control part turns the third and fourth switching elements OFF in the first state, turns the third and fourth switching elements ON in the second state, and turns the fourth switching element ON and the third switching element OFF in the third state.

7. A step-up/step-down type DC-DC converter comprising:
a first switching element connected between a voltage input terminal and one terminal of an inductance element;
a first rectifying element connected between a reference potential and one terminal of the inductance element;
a second rectifying element connected between a voltage output terminal and the other terminal of the inductance element;
a second switching element connected between the reference potential and the other terminal of the inductance element; and
a control part for controlling: a first state where the first and second switching elements are ON; a second state where the first and second switching elements are OFF; and a third state where the first switching element is ON and the second switching element is OFF, wherein either one of the first state and the second state is set in a first cycle and, in case that the first state is set, the first state is switched to the second state when current of the inductance element reaches a given value in the first cycle, and wherein the first state is set in a second cycle following the first cycle and the first state is switched to the third state when current of the inductance element reaches the given value in the second cycle;
wherein the first cycle includes a consecutive sequence of the first state and the second state, or includes the second state; and
wherein the second cycle includes a consecutive sequence of the first state and the third state.

8. A control circuit of a step-up/step-down type DC-DC converter comprising:
a first switching element connected between a voltage input terminal and a first terminal of an inductance element, the first switching element including an inverse parallel diode which is conductive in a direction from the first terminal of the inductance element to the voltage input terminal;
a second switching element connected between a reference potential and the first terminal of the inductance element;
a third switching element connected between the reference potential and the second terminal of the inductance element;
a fourth switching element connected between a voltage output terminal and the second terminal of the inductance element;
a soft-start control circuit for outputting a soft-start signal to step-up or step-down as time passes;
an error amplifier for amplifying an error between a reference voltage to determine set voltage of an output voltage or the soft-start signal, whichever is lower, and the output voltage; and
a switching circuit, during a term where the output voltage is lower than the input voltage, alternately switching a first state where the first and third switching elements are ON and a second state where the second and fourth switching elements are ON depending on an output from the error amplifier, and during a term where the output voltage is higher than the input voltage, the switching circuit alternately switching the third switching element and the fourth switching element depending on an output from the error amplifier with the first switching element and the second switching element being set ON and OFF, respectively;
wherein the soft-start signal is at least one of, a) a control signal to make the output voltage gradually step-up to a predetermined voltage when the DC-DC converter starts up, and
b) a control signal to make the output voltage gradually step-down to a zero voltage when the DC-DC converter terminates.

9. The control circuit of the step-up/step-down type DC-DC converter according to claim 8, wherein the switching control circuit comprises:
   a control signal generating circuit for outputting a control signal having pulse width depending on level of the output signal from the error amplifier;
   a comparator for comparing the output voltage and the input voltage;
   a mask circuit, depending on a result obtained by the comparator, allowing the control signal to pass during the term where the output voltage is lower than the input voltage, and masking the control signal during the term where the output voltage is higher than the input voltage.

10. The control circuit of the step-up/step-down type DC-DC converter according to claim 9, wherein an output from the comparator is set to low-level during the term where the output voltage is higher than the input voltage, and the mask circuit is an AND circuit.

11. The control circuit of the step-up/step-down type DC-DC converter according to claim 8, wherein the error amplifier comprises:
   a first terminal which the output voltage is inputted to and has a first polarity;
   a second terminal which the reference voltage inputted to and has a second polarity;
   a third terminal which the soft-start signal is inputted to and has the second polarity.

12. The control circuit of the step-up/step-down type DC-DC converter according to claim 9, wherein the error amplifier comprises:
   a first terminal which the output voltage is inputted to and has a first polarity;
   a second terminal which the reference voltage inputted to has a second polarity;
   a third terminal which the soft-start signal is inputted to and has the second polarity.

13. The control circuit of the step-up/step-down type DC-DC converter according to claim 10, wherein the error amplifier comprises:
   a first terminal which the output voltage is inputted to and has a first polarity;
   a second terminal which the reference voltage inputted to and has a second polarity;
   a third terminal which the soft-start signal is inputted to has the second polarity.

14. A control method of a step-up/step-down type DC-DC converter including: a first switching element connected between a voltage input terminal and a first terminal of an inductance element; a second switching element connected between a reference potential and the first terminal of the inductance element; a third switching element connected between the reference potential and the second terminal of the inductance element; and a fourth switching element connected between a voltage output terminal and the second terminal of the inductance element, the method comprising:
   setting the first through fourth switching elements OFF;
   repeating a consecutive sequence of a first state where the first and third switching elements are set ON and a second state where the second and fourth switching elements are set ON alternately, in response to a start-up command; and
   keeping the first switching element and the second switching element ON and OFF, respectively, when the output voltage becomes higher than the input voltage, and alternately repeating ON-setting of the third switching element and ON-setting of the fourth switching element.

15. A step-up/step-down type DC-DC converter comprising:
   a first switching element connected between a voltage input terminal and a first terminal of an inductance element, the first switching element including an inverse parallel diode which is conductive in a direction from the first terminal of the inductance element to the voltage input terminal;
   a second switching element connected between a reference potential and the first terminal of the inductance element;
   a third switching element connected between the reference potential and the second terminal of the inductance element;
   a fourth switching element connected between a voltage output terminal and the second terminal of the inductance element;
   a soft-start control circuit for outputting a soft-start signal to step-up or step-down as time passes;
   an error amplifier for amplifying an error between a reference voltage to determine set voltage of an output voltage or the soft-start signal, whichever is lower, and the output voltage; and
   a switching circuit, during a term where the output voltage is lower than the input voltage, alternately switching a first state where the first and third switching elements are ON and a second state where the second and fourth switching elements are ON depending on an output from the error amplifier, and during a term where the output voltage is higher than the input voltage, the switching circuit alternately switching the third switching element and the fourth switching element depending on an output from the error amplifier with the first switching element and the second switching element being set ON and OFF, respectively;
   wherein the soft-start signal is at least one of,
      a) a control signal to make the output voltage gradually step-up to a predetermined voltage when the DC-DC converter starts up, and
      b) a control signal to make the output voltage gradually step-down to a zero voltage when the DC-DC converter terminates.

\* \* \* \* \*